US010385910B2

(12) United States Patent
Gai et al.

(10) Patent No.: US 10,385,910 B2
(45) Date of Patent: Aug. 20, 2019

(54) STEERING GEAR FOR BOATS

(71) Applicants: Marcella Gai, Genoa (IT); Walter Trivella, Genoa (IT)

(72) Inventors: Marcella Gai, Genoa (IT); Walter Trivella, Genoa (IT)

(73) Assignee: Ultraflex S.p.A., Casella (GE) (IT)

( * ) Notice: Subject to any disclaimer, the term of this patent is extended or adjusted under 35 U.S.C. 154(b) by 0 days.

(21) Appl. No.: 14/528,777

(22) Filed: Oct. 30, 2014

(65) Prior Publication Data

US 2016/0121988 A1    May 5, 2016

(30) Foreign Application Priority Data

Nov. 6, 2013   (IT) .............................. GE2013A0106

(51) Int. Cl.
*F16C 1/14*   (2006.01)
*B63H 25/10*   (2006.01)

(52) U.S. Cl.
CPC .............. *F16C 1/14* (2013.01); *B63H 25/10* (2013.01); *F16C 2326/30* (2013.01)

(58) Field of Classification Search
CPC ........ B63H 25/10; B63H 25/20; B63H 25/02; F16C 1/18; F16C 1/20; F16H 19/0631; B62D 1/20; B62D 3/02; B62D 5/001
See application file for complete search history.

(56) References Cited

U.S. PATENT DOCUMENTS

| 3,258,989 | A | * | 7/1966 | Frese | .................... | B63H 25/10 |
| | | | | | | 74/496 |
| 3,403,578 | A | * | 10/1968 | Morse | .................. | B63H 21/265 |
| | | | | | | 114/160 |
| 3,550,469 | A | * | 12/1970 | Morse | .................... | B63H 25/10 |
| | | | | | | 254/297 |
| 3,954,022 | A | * | 5/1976 | Hemens | ................. | B63H 25/10 |
| | | | | | | 74/496 |
| 4,014,281 | A | * | 3/1977 | Hemens | ................. | B63H 25/10 |
| | | | | | | 114/144 R |
| 4,292,859 | A | * | 10/1981 | Teraura | .................. | B63H 25/10 |
| | | | | | | 74/496 |
| 4,645,245 | A | * | 2/1987 | Cunningham | ........ | F16L 37/088 |
| | | | | | | 285/321 |

(Continued)

FOREIGN PATENT DOCUMENTS

WO   2007060035   5/2007

*Primary Examiner* — Zakaria Elahmadi
(74) *Attorney, Agent, or Firm* — Themis Law

(57) ABSTRACT

A steering gear for boats includes a control member connected to a drive shaft of a transmission having at least two dynamically engaged transmission elements, in particular, an input element and an output element. The output element drives a motion transfer member of the control member transferring motion to an operating unit, such that any displacement/rotation of the control member is transferred to the transfer member through the transmission. The motion transfer member includes a pull and/or push cable and a coupling member that is slidably attached to the steering gear and has a plurality of coupling seats, at least one of which is designed to engage a corresponding coupling claw on the steering gear. The coupling member includes a sheath-like element in which the pull and/or push cable is configured to slide, and the coupling seats include two annular throats of the sheath.

8 Claims, 4 Drawing Sheets

(56) References Cited

U.S. PATENT DOCUMENTS

| | | | | |
|---|---|---|---|---|
| 4,735,165 A * | 4/1988 | Baba | ............... | B63H 25/10 |
| | | | | 114/144 R |
| 4,961,392 A * | 10/1990 | Ballard | ............... | B63H 25/10 |
| | | | | 114/144 R |
| 5,111,761 A * | 5/1992 | Gilbertson | ............... | B63H 25/10 |
| | | | | 114/144 R |
| 5,702,275 A * | 12/1997 | Hundertmark | ............... | B63H 25/12 |
| | | | | 114/150 |
| RE36,771 E * | 7/2000 | Carlson | ............... | F16C 1/262 |
| | | | | 285/305 |
| 6,293,167 B1 * | 9/2001 | Latz | ............... | B62D 1/187 |
| | | | | 464/112 |
| 6,293,596 B1 * | 9/2001 | Kinder | ............... | F16L 37/144 |
| | | | | 285/305 |
| 7,806,619 B2 * | 10/2010 | Bodtker | ............... | F16D 3/2052 |
| | | | | 403/121 |
| 9,242,711 B2 * | 1/2016 | Gai | ............... | B63H 25/10 |
| 2001/0027739 A1 * | 10/2001 | Simard | ............... | B63H 11/113 |
| | | | | 114/55.52 |
| 2004/0224581 A1 * | 11/2004 | Mizuguchi | ............... | B63H 20/00 |
| | | | | 440/61 S |
| 2006/0053936 A1 * | 3/2006 | Wancket | ............... | B62K 23/04 |
| | | | | 74/501.6 |
| 2008/0245173 A1 * | 10/2008 | Schwerin | ............... | B25J 9/06 |
| | | | | 74/471 XY |
| 2011/0010028 A1 * | 1/2011 | Mizutani | ............... | B63H 25/00 |
| | | | | 701/21 |
| 2013/0160689 A1 * | 6/2013 | Gai | ............... | B63H 25/02 |
| | | | | 114/154 |
| 2014/0338476 A1 * | 11/2014 | Miller | ............... | B63H 25/10 |
| | | | | 74/89.2 |

* cited by examiner

STEERING GEAR FOR BOATS

FIELD OF THE INVENTION

The present invention relates to a steering gear for boats that comprises a control member, such as a steering wheel, a lever or the like, connected to a drive shaft of a transmission.

The transmission is composed of at least two dynamically engaged transmission elements, in particular, an input element and an output element, the output element driving a motion transfer member of the control member, which is designed to transfer motion to an operating unit, such that any displacement/rotation of the control member is transferred to the transfer member through the transmission.

Moreover, the motion transfer member includes a pull and/or push cable.

BACKGROUND OF THE INVENTION

The above described configuration is based on a common configuration of steering gears for boats, in particular, of a mechanical steering gear that control boats.

These steering gears have a control member, whose displacement actuates the different parts of a transmission, which is adapted to transfer the displacement of the control member into a corresponding actuation of an operating unit for controlling, for example, a steering actuator.

These steering gears are widely used in boats due to their easy construction, installation and assembly.

Due to the wide use of these steering gears, spare parts should be readily available for replacing any damaged part. Instead, universal parts, i.e. parts that may be adapted to steering gears produced by any manufacturer, are hard to find in the marketplace.

Moreover, the configuration of these steering gears and the mechanisms involved expose the parts of the transmission to high wear.

A particularly important part, in this respect, is the pull and/or push cable found in these types of gear.

Replacement of damaged cables with undamaged ones is often required, but this operation is difficult, both in terms of installation of prior art cables, and because cables compatible with the steering gear owned by the user are not always available.

A possible solution to this problem consists in limiting cable wear, that is, in reducing cable replacement frequency compared to prior art steering gears.

Cable adaptability is also an important aspect, because the cable should be fitted into the steering gear without creating clearances or slacks, which would cause permanent deformations, as well as a malfunctioning or possible failure of the steering gear.

Therefore, there exists a yet unfulfilled need for a steering gear that might obviate the above described drawbacks of prior art steering gears.

SUMMARY OF THE INVENTION

The present invention achieves the above described objectives by providing a steering gear as described hereinafter, in which the pull and/or push cable includes a coupling member for slidable attachment to the steering gear having a plurality of coupling seats, at least one of which is designed for engagement with a corresponding coupling claw on the steering gear.

The coupling member also includes a sheath-like element or the like for the pull and/or push cable to slide therein.

Moreover, the two coupling seats include two annular throats of the sheath.

The provision of two different coupling seats allows the pull and/or push cable to be placed in different positions and to fit various types of steering gears.

It should be noted that the provision of two different coupling seats allows also the position of the cable to be adjusted for the latter to fit various types of steering gears, and also affords a stable coupling of the coupling member of the cable.

Thus, the cable is stably secured to the steering gear and, regardless of the forces applied thereto, the coupling seat selected for securing the cable is the same.

Furthermore, as more clearly explained by the exemplary embodiments shown in the figures, the construction is simple and requires no additional cable fastening member.

Such simple construction is a key feature for the steering gears and for all the devices that fall within the scope of the present invention, as it can limit the number of the parts in use, thereby decreasing failure probability and maintenance requirements.

As shown by the exemplary embodiments of a steering gear according the present invention, the additional features that are described below are mainly intended to facilitate installation of the cable in the steering gear and to increase efficiency of the steering gear by improving the coupling of the parts.

In a preferred embodiment, the steering gear, particularly the transmission part thereof, has the features of commonly owned Italian Patent 01238760, the content of which are incorporated herein by reference.

In particular, the transmission includes a central pinion driven by the drive shaft, which is dynamically engaged to two or more rotatably mounted planet gears that are rigidly joined to a motion output member, such that the motion output member is free to rotate about the axis of rotation of the drive shaft.

The planet gears are dynamically engaged to an internal toothing on the inner surface of the fixed outer casing that contains the transmission. The coupling claw may be formed of one piece with the outer casing, and in this case the cable is forced into the housing compartment and the coupling claw and the corresponding coupling seat are in form-fit engagement.

Alternatively, the coupling claw includes a pin, which fits into the housing compartment along an axis perpendicular to the axis of insertion of the coupling member, the outer lateral surface of the pin engaging at least one of the two coupling seats.

This arrangement facilitates installation of the pull and/or push cable, and enables it to be secured once it has been adjusted to the most appropriate position, i.e. upon section of the coupling seat to be used.

In order to improve adaptability of the parts of a steering gear according the present invention, the two coupling seats have different sizes and/or shapes.

In addition to improving adaptability of a steering gear according to the present invention, the different shapes of the coupling seats provide feedback about proper installation of the cable in the steering gear, i.e. they can be used to check whether the proper seat has been selected for installation, without clearances or slacks between the coupling member and the inner toothing of the steering gear.

Since the coupling member is preferably fixed to the steering gear by means of a pin, the two different seats with differently shaped coupling seats are only compatible with the pin that is used in the steering gear.

In one embodiment, one of the two annular throats has a profile with the shape of a circular sector, with a constant radius of curvature, whereas the other throat has a profile with a middle portion having a straight line connected to the side wall of the sheath by two curvilinear sections with identical radii of curvature.

In one embodiment, the distance between the center of at least one of the coupling seats and the head end side of the coupling member is greater than the inside diameter of such seat.

With this arrangement, the cable is more stably coupled because, as more clearly shown in the description of a few exemplary embodiments, the fastening point is closer to the center than the stress points associated with stresses applied by the sea and by the action of users on the steering wheel.

Furthermore, the selection of appropriate proportions for making the coupling member provides for a coupling member with two coupling seats without requiring any significant size increase.

The present invention also relates to a steering gear for boats comprising at least one control member such as a steering wheel, a lever or the like, connected to a drive shaft of a transmission, which includes at least two dynamically engaged transmission elements, i.e. an input element and an output element. The output element drives a motion transfer member of the control member, which is designed to transfer motion to an operating unit, such that any displacement/rotation of the control member is transferred to the transfer member through the transmission.

The motion transfer member includes a pull and/or push cable having a coupling member for slidable attachment to the steering gear, the coupling member having at least one coupling seat designed for engagement with a corresponding coupling claw on the steering gear.

The coupling member includes a sheath-like element for the pull and/or push cable to slide therein, the at least one coupling seat being formed as an annular throat of the sheath.

In addition, the transmission is contained in a fixed outer casing.

The outer casing has a housing compartment for accommodating the coupling member, which includes at least one abutment member.

The coupling seat is located at such a distance from the end side of the coupling member that, upon engagement, the abutment member at least partially abuts the walls of the housing compartment.

This feature has a particularly advantageous aspect, in that the abutment of such end enables a proper installation of the cable, which means that, when the cable is properly inserted into the housing compartment, the coupling member comes to abutment in the housing compartment.

In particular, a rear abutment is provided, which means that the abutment member has a radially enlarged portion of the sheath located below the coupling seat, opposite to the direction in which the abutment member fits into the housing compartment.

The provision of a rear abutment is not only a possible constructive variant to the front abutment, but also affords the abutment of the coupling member without requiring its length to be exactly equal to that of the housing compartment of the steering gear.

Abutment does not occur at the head end side, but on the rear, whereby there is no need to set a precise and given length between the pin coupling seat and the head end side of the coupling member.

This improves adaptability of the cable and the steering gear having the feature of a rear abutment member.

Such steering gear, and particularly its coupling member, may include one or more of the previously described features.

The present invention also relates to a pull and/or push cable comprising a coupling member for slidable attachment of the cable to a steering gear for boats.

The coupling member includes one or more of the above described features of the steering gear of the present invention.

BRIEF DESCRIPTION OF THE DRAWINGS

These and other features and advantages of the present invention will appear more clearly from the following description of a few embodiments, illustrated in the enclosed drawings, in which.

It shall be understood that, while the below described figures illustrate a preferred embodiment, they are not intended to limit the scope of the claimed invention and are provided only for illustration purposes.

DETAILED DESCRIPTION OF EMBODIMENTS OF THE PRESENT INVENTION

In a preferred embodiment, a steering gear for boats according to the present invention comprises at least one control member, such as a steering wheel, a lever or the like, connected to a drive shaft 11 of a transmission.

The transmission includes at least two dynamically engaged transmission elements, i.e. an input transmission element and an output transmission element.

The output element drives at least one motion transfer member 3 of the control member, which is designed to transfer motion to an operating unit, such that any displacement/rotation of the control member is transferred to the transfer member 3 through the transmission connected to the drive shaft.

Figures 1A, 1B:
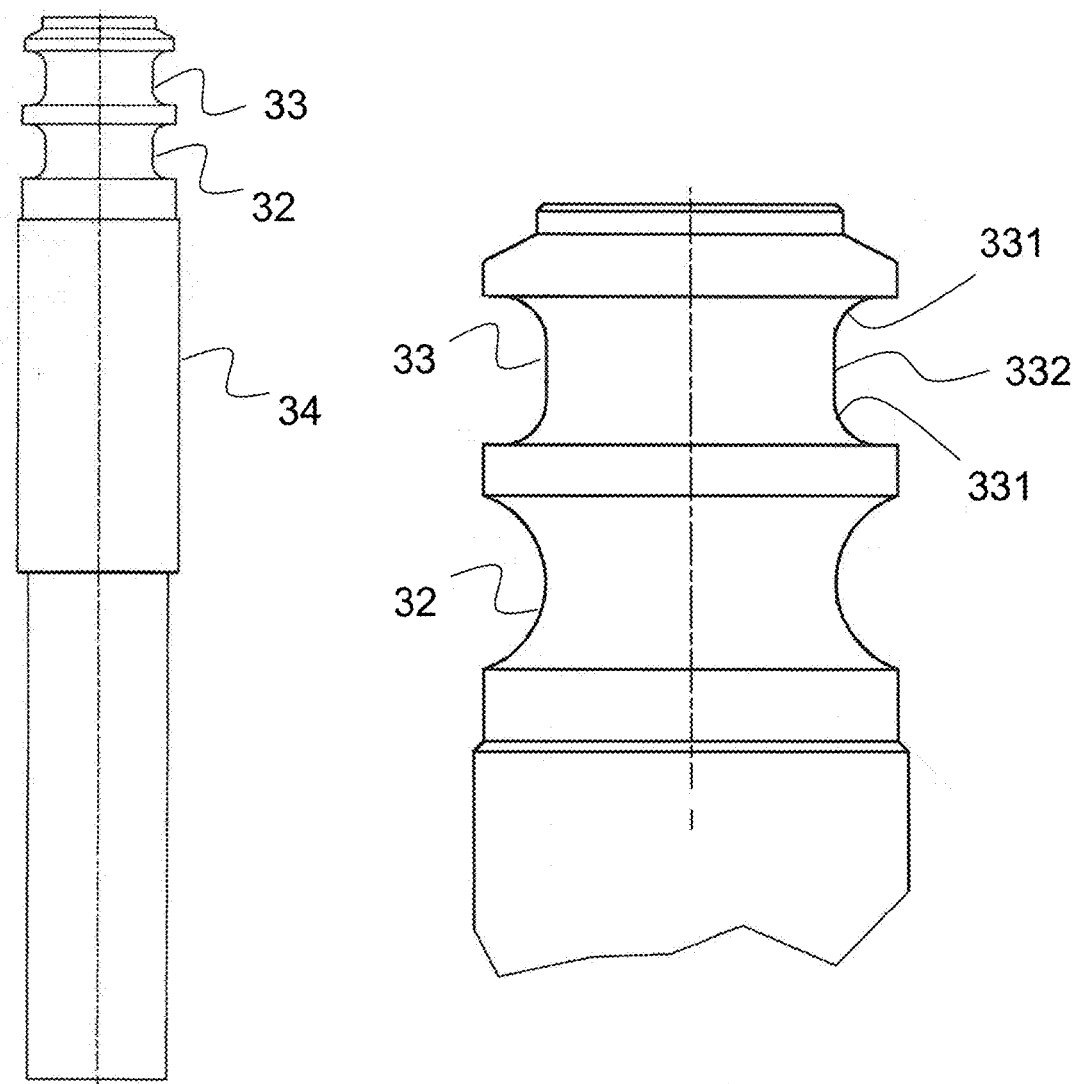
FIG. 1a shows a detail of a part of a steering gear according to the present invention.
FIG. 1b shows a detail of a coupling member of the pull and/or push cable according to the present invention.

Particularly referring to FIG. 1a, the motion transfer member 3 consists of a pull and/or push cable 3.

The transmission is contained in a fixed outer casing 13.

The pull and/or push cable 3 includes a coupling member for slidable attachment to the steering gear.

The coupling member may consist of a sheath-like element 34 or the like for the pull and/or push cable 3 to slide therein. Particularly referring to the figures, the coupling member has at least two coupling seats 32 and 33, at least one of which is designed for engagement with a corresponding coupling claw 4 located on the steering gear as shown in FIGS. 2a and 2b.

Furthermore, the coupling member consists of a sheath-like element 34 for the pull and/or push cable 3 to slide therein, and the coupling seats 32 and 33 consist of two annular throats of the sheath 34.

Figure 2A:
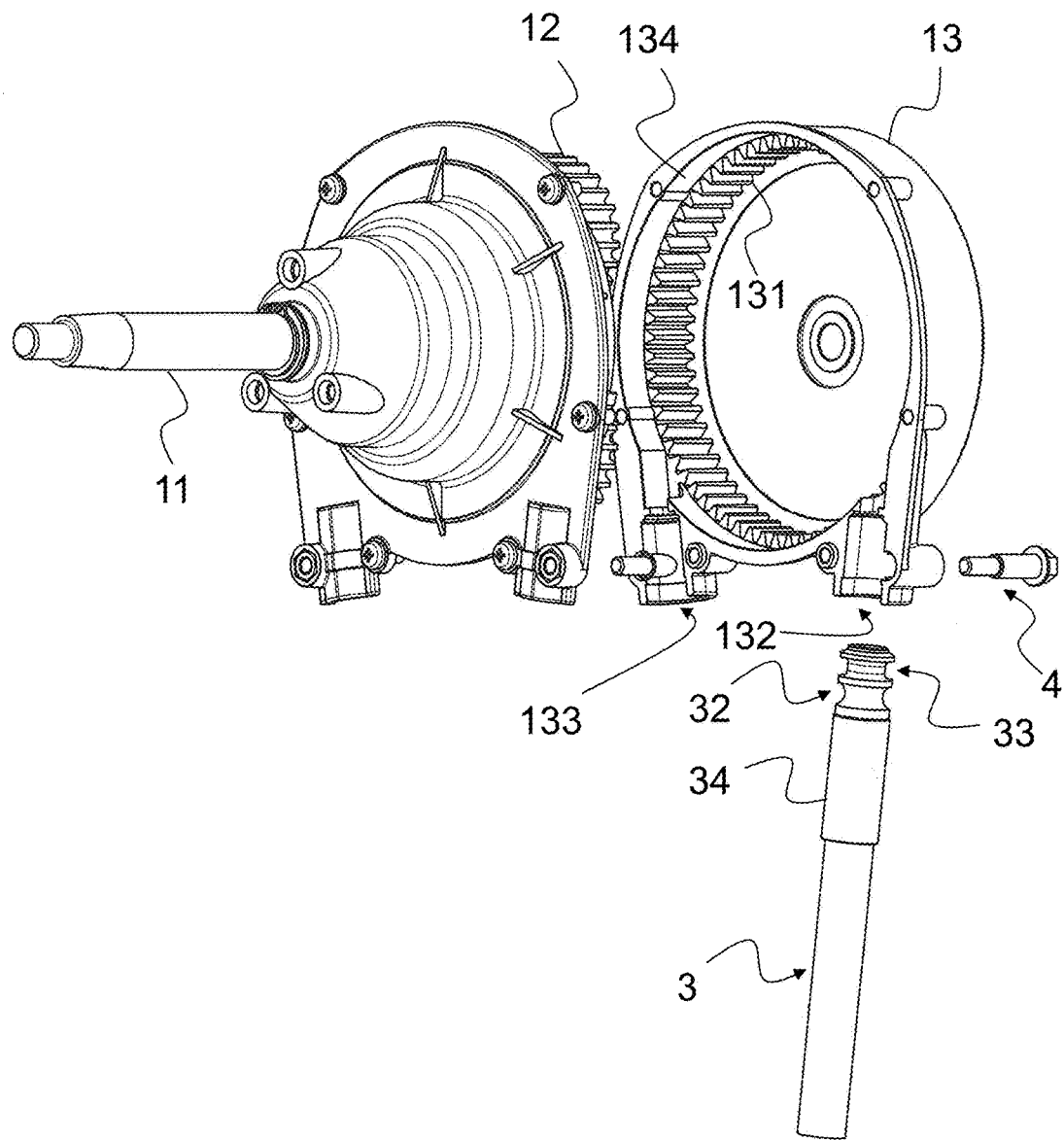
FIGS. 2a and 2b show two exploded views of a steering gear according to the present invention, particularly with a cable not inserted in the steering gear and with a cable inserted in the steering gear.
Figure 2B:
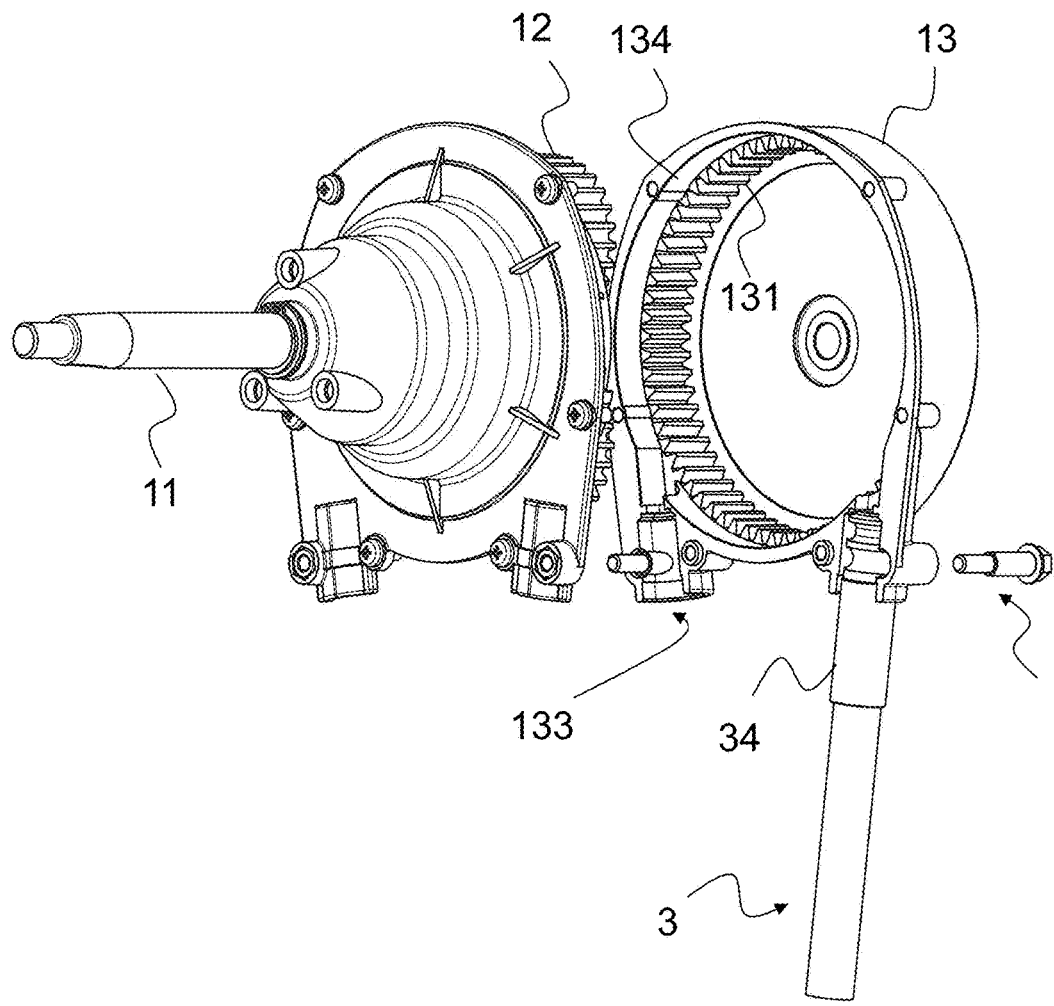

Particularly referring to FIGS. 2a and 2b, a transmission according to the present invention consists of a central pinion, not shown, which is driven by the drive shaft 11. The central pinion is dynamically engaged to two or more rotatably mounted planet gears 12, which are rigidly joined to a motion output member, such that the motion output member is free to rotate about the axis of rotation of the drive shaft 11.

A similar construction is described in commonly owned Italian patent no. 01238760, the content of which are incorporated herein by reference.

The planet gears 12 are dynamically engaged to an internal toothing 131 on the inner surface of a fixed outer casing 13, containing the transmission. As it is known, in the operation of epicyclic gears the rotation of the drive shaft 11 actuates the central pinion and the planet gears 12, which mesh with the inner toothing 131 and set the motion output member, not shown, into rotation.

The motion output member has a toothing on its peripheral edge for driving the cable 3, preferably of epicyclic type.

The outer casing 13 has at least one housing compartment 132 for at least partially accommodating the coupling member of the cable 3.

Advantageously, as shown in FIGS. 2a and 2b, the coupling claw consists of a pin 4, which fits into the housing compartment 132 along an axis perpendicular to the axis of insertion of the coupling member.

In particular, the outer lateral surface of the pin 4 engages at least one of the two coupling seats 32, 33.

Particularly referring to FIG. 2a, the cable 3 is inserted with its coupling member into the housing compartment 132 of the outer casing 13.

Once inserted, as shown in FIG. 2b, the pin 4 is mounted to engagement with one of the two coupling seats 32, 33.

Also as shown in FIG. 2b the outer surface of the pin 4 comes to engage the lower coupling seat 32, but it may engage the upper coupling seat 33 by simple adjustment of the extent to which the cable 3 is inserted into the housing compartment 132.

Once the cable 3 has been inserted and coupled to the steering gear by way of engagement of one of the two seats 32, 33 with the pin 4, the rotation of the drive shaft 11 enables movement of the cable 3.

The cable 3 is engaged with the driving teeth of the motion output member and the rotation of the output member, driven by the drive shaft 11, causes the cable 3 to move.

The cable 3 is driven by the motion output member, slides in the sheath 34 and moves out of the housing compartment 132 to come out of the exit compartment 133, once it has run along the running channel 134.

In a possible embodiment, the two coupling seats 32 and 33 have different sizes and/or shapes.

Moreover, particularly referring to FIG. 1b, the annular throat 32 has a profile shaped as a circular sector with a constant radius of curvature, whereas the other throat 33 has a profile with a middle portion 332 consisting of a straight line, which is connected to the side wall of the sheath 34 by two curvilinear sections 331 with identical radii of curvature.

In particular, the two curvilinear sections 331 are symmetrically connected to the ends of the middle section 332 with respect to a plane perpendicular to the axis of rotation of the drive shaft 11.

In one embodiment, the center of the annular throat 32 has a distance from the center of the annular throat 33 that preferably ranges from 15 mm to 4 mm, and may be 9.25 mm.

Preferably, the distance between the center of at least one of the coupling seats 32, 33 and the head end side of the coupling member is greater than the inside diameter of such seat.

Figure 3A:
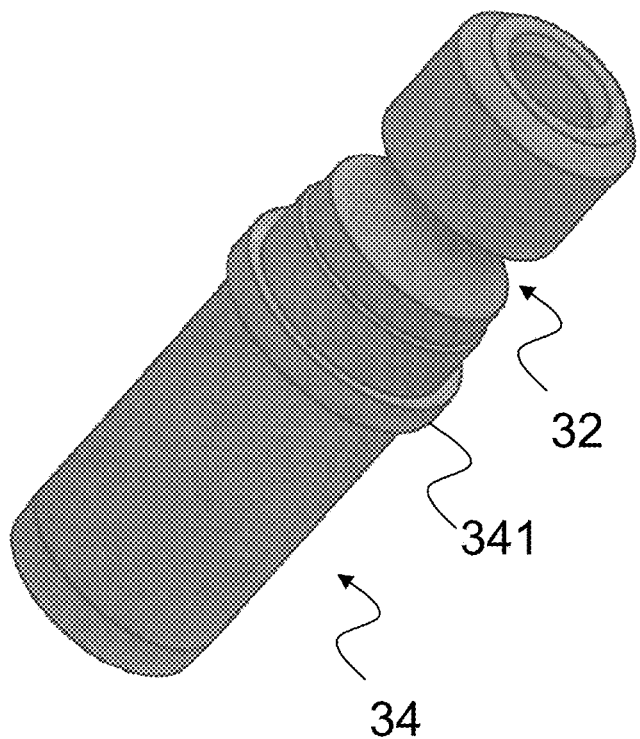
FIG. 3a shows a perspective view and FIG. 3b shows a side view of a cable according to the present invention.
Figure 3B:
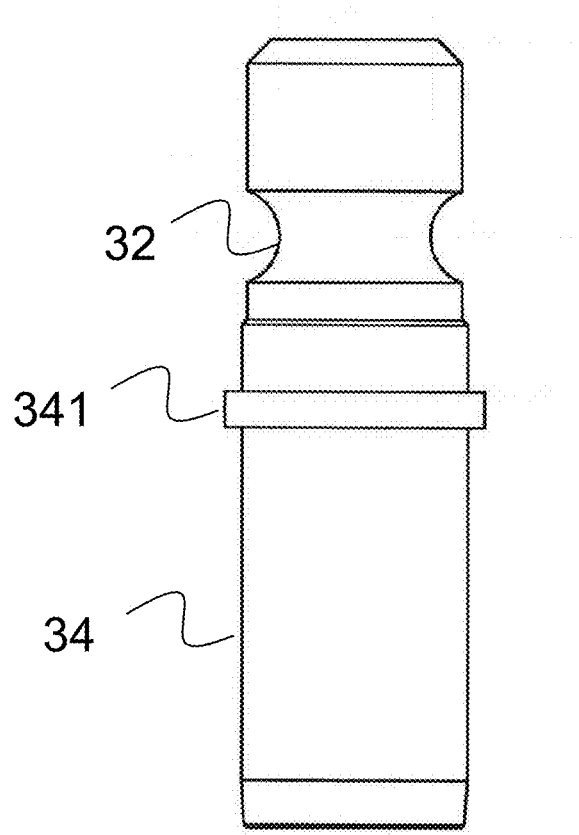

This variant is clearly shown in FIG. 3b, where the coupling seat 32 has a distance from the head end side that is greater than its diameter.

Particularly, FIGS. 3a and 3b show a variant embodiment of a cable according to the present invention, in which the pull and/or push cable 3 has a coupling member for slidable attachment thereof to the steering gear and at least one coupling seat 32 designed for engagement with a corresponding coupling claw 4 on the steering gear.

The coupling member has at least one abutment member 341, the coupling seat 32 being located at such a distance from the head end side of the coupling member that, upon engagement, the abutment member 341 abuts at least part of the walls of the housing compartment 132.

In particular, the abutment member 341 provides for a rear abutment, which means that the abutment member consists of a radially enlarged portion of the sheath 34 located below the coupling seat 32, opposite to the direction in which the abutment member fits into the housing compartment 132.

Advantageously, the abutment member 341 may consist of an element that is made of an elastically deformable material, such as an O-ring or the like, for easier coupling of the cable 3 even when foreign agents are present in the housing seat 132.

Alternatively, the abutment member 341 may be formed as one piece with the sheath 34 or consist of a ring, an O-ring or the like, which is designed to be pressed onto the sheath in the desired position to fix the abutment member 341 to the sheath 34. While FIGS. 3a and 3b show a variant embodiment in which the coupling member has a single coupling seat 32, such variant shall not be intended to limit the present invention, and a cable as shown in FIGS. 3a and 3b may be also provided with two coupling seats as shown in FIGS. 1a and 1b.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become apparent to those skilled in the art and the scope of the present invention is limited only by the appended claims.

The invention claimed is:

1. A steering gear for boats, comprising:
   a control member; and
   a transmission having a drive shaft connected to the control member,
   wherein said transmission comprises:
   an input transmission element and an output transmission element dynamically connected to one another, the output transmission element driving a motion transfer member of said control member configured to transfer motion to an operating unit, such that any displacement or rotation of said control member is transferred to said transfer member through said transmission,
   wherein said motion transfer member comprises a pull/push cable, wherein said pull/push cable includes a coupling member for slidable attachment of said pull/push cable to said steering gear, said coupling member having a plurality of coupling seats, each of said coupling seats being shaped to engage a coupling claw on said steering gear, wherein said coupling member comprises a sheath element configured for said pull/push cable to slide therein without intervening members therebetween, wherein said plurality of coupling seats are configured as annular throats of said sheath, wherein said coupling member is at least partially received into a housing compartment of a fixed outer casing of said output transmission element, and wherein said coupling pawl extends through said housing to engage one of said coupling seats.

2. The steering gear as claimed in claim 1, wherein said transmission further comprises a central pinion driven by said drive shaft, said central pinion being dynamically engaged with two or more rotatably mounted planet gears, said planet gears being rigidly joined to a motion output member, such that said motion output member is free to rotate about an axis of rotation of said drive shaft, and wherein said planet gears are dynamically engaged to an internal toothing on an inner surface of said fixed outer casing containing said transmission.

3. The steering gear as claimed in claim 2, wherein said coupling claw comprises a pin, which fits into said housing compartment along an axis perpendicular to an axis of insertion of said coupling member, an outer lateral surface of said pin engaging at least one of said plurality of coupling seats.

4. The steering gear as claimed in claim 1, wherein said plurality of coupling seats have different sizes or shapes.

5. The steering gear as claimed in claim 1, wherein a distance between a center of at least one of said coupling seats and a head end side of said coupling member is greater than an inside diameter of such at least one of said coupling seats.

6. A steering gear for boats, comprising:
a control member; and
a transmission having a drive shaft connected to the control member,
wherein said transmission comprises:
an input transmission element and an output transmission element, said output element driving a motion transfer member of said control member configured to transfer motion to an operating unit, such that any displacement or rotation of said control member is transferred to said transfer member through said transmission, wherein said motion transfer member comprises a pull/push cable, wherein said transmission is contained within a fixed outer casing, wherein said pull/push cable includes a coupling member for slidable attachment to said steering gear, said coupling member having at least one coupling seat shaped to engage a corresponding coupling claw on said steering gear, wherein said coupling member comprises a sheath element for said pull/push cable to slide therein without intervening members therebetween, wherein said at least one coupling seat is configured as an annular throat of said sheath, wherein said outer casing has a housing compartment accommodating said coupling member, said housing compartment having walls, said coupling member having at least one abutment member, wherein said at least one coupling seat is located at such a distance from a head end side of said coupling member that, upon engagement, said abutment member abuts at least part of said walls of said housing compartment, and wherein said abutment member is configured as a radially enlarged portion extending outwardly from said sheath and located at a longitudinal distance from said at least one coupling seat, opposite to a direction in which said abutment member fits into said housing compartment.

7. The steering gear for boats as claimed in claim 6, wherein said coupling claw comprises a pin, which fits into said housing compartment along an axis perpendicular to an axis of insertion of said coupling member, an outer lateral surface of said pin engaging one of said at least one coupling seat.

8. The steering gear for boats as claimed in claim 6, wherein a distance between a center of said at least one coupling seat and a head end side of said coupling member is greater than an inside diameter of such at least one of said coupling seats.

* * * * *